E. STROUD.
Combined Hames and Horse-Collar.

No. 163,950. Patented June 1, 1875.

UNITED STATES PATENT OFFICE.

EZRA STROUD, OF RICEFORD, MINNESOTA.

IMPROVEMENT IN COMBINED HAMES AND HORSE-COLLARS.

Specification forming part of Letters Patent No. 163,950, dated June 1, 1875; application filed April 3, 1875.

*To all whom it may concern:*

Be it known that I, EZRA STROUD, of Riceford, Houston county, Minnesota, have invented a new and useful Improvement in Combined Hames and Horse-Collars, of which the following is a specification:

The improvement relates particularly to the means whereby the upper ends of the hames are connected and adjusted, as hereinafter described.

Figure 1:
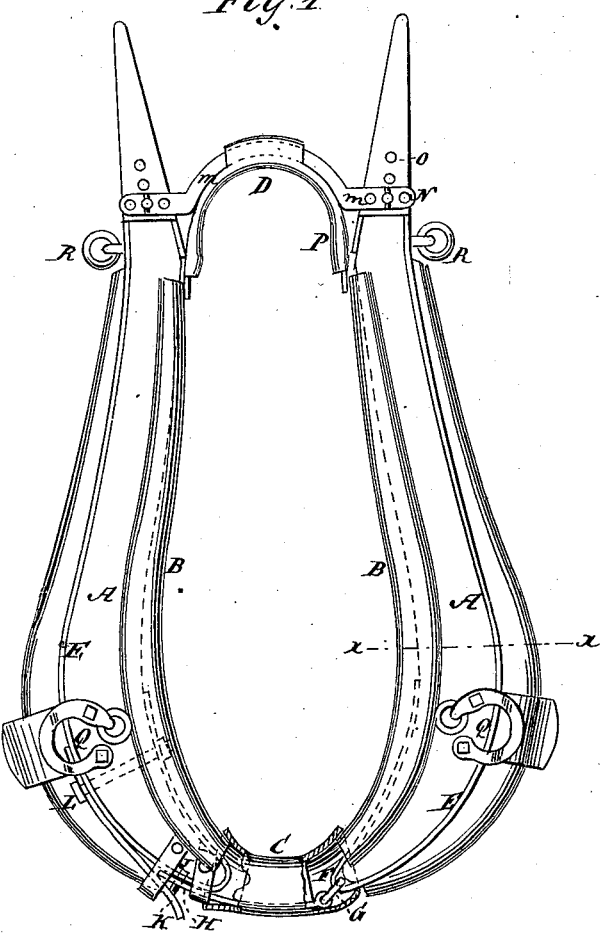
Figure 2:
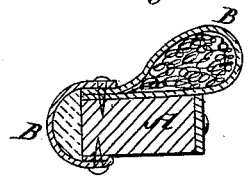
Figure 3:
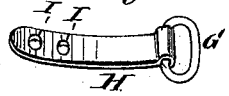

Figure 1 is a front view. Fig. 2 is a cross-section of Fig. 1, taken on the line $x$ $x$; and Fig. 3 is a detail, showing a side view of the lower adjusting-strap.

Similar letters of reference indicate corresponding parts.

A represents the harness; B, the padded collar attached permanently thereto. C is the breast-connection. D is the neck-connection. Both of these connections are adjustable, so as to fit horses of different size. E is a metallic strap on the outer edge of each hame. At the lower end, the right-hand strap turns upward around the hame, as seen in dotted lines, and to the bend, or at the point F, is attached a ring, G, and to the ring the fastening and adjusting strap H is attached. In the end of this strap are holes I, which receive a pin, J, in a strap, K, on the other hame, attached thereto as seen at L. By this means the combined collar and hames may be spread or closed to fit the necks or breasts of horses of different size. At the neck the connection is made by a bow-rod, $m$, on each side of the hames, in the ends of which are holes N, and also holes O through the hames, which allow of an adjustment in width, and also in height, to fit the size of the horse. P represents padding beneath the iron $m$. The tugs or draft-straps are attached to the loops Q Q, and the harness-straps are attached to the rings R R.

Having thus described my invention, I claim as new and desire to secure by Letters Patent—

The hames A, having holes $o$, the bow-rods M M, having a series of holes, N, in their end portions, and supporting the neck-pad D, all combined as shown and described, for the purpose specified.

EZRA STROUD.

Witnesses:
D. STROUD,
H. C. LEE.